(12) United States Patent
Gessendorfer et al.

(10) Patent No.: US 9,458,886 B2
(45) Date of Patent: Oct. 4, 2016

(54) CAGE SEGMENT OF A TAPERED ROLLER BEARING, AND TAPERED ROLLER BEARING

(71) Applicants: Matthias Gessendorfer, Unterspiesheim (DE); Baozhu Liang, Dittelbrunn-Hambach (DE); Winfried Oestreicher, Schwebheim (DE); Ralf Wahler, Bergrheinfeld (DE)

(72) Inventors: Matthias Gessendorfer, Unterspiesheim (DE); Baozhu Liang, Dittelbrunn-Hambach (DE); Winfried Oestreicher, Schwebheim (DE); Ralf Wahler, Bergrheinfeld (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/399,550

(22) PCT Filed: Apr. 22, 2013

(86) PCT No.: PCT/EP2013/058257
§ 371 (c)(1),
(2) Date: Nov. 7, 2014

(87) PCT Pub. No.: WO2013/167363
PCT Pub. Date: Nov. 14, 2013

(65) Prior Publication Data
US 2015/0219157 A1  Aug. 6, 2015

(30) Foreign Application Priority Data
May 7, 2012 (DE) .................. 10 2012 207 529

(51) Int. Cl.
*F16C 33/51* (2006.01)
*F16C 33/46* (2006.01)
(Continued)

(52) U.S. Cl.
CPC ........... *F16C 33/513* (2013.01); *F16C 19/364* (2013.01); *F16C 33/467* (2013.01);
(Continued)

(58) Field of Classification Search
CPC .... F16C 43/06; F16C 41/008; F16C 19/364; F16C 33/513; F16C 2300/14; F16C 43/065; F16C 33/467; F16C 33/4676; Y10T 29/4968; Y10T 29/49691

USPC ....... 384/565, 571–573, 578, 580, 593, 623; 29/898.061, 898.067
See application file for complete search history.

(56) References Cited

U.S. PATENT DOCUMENTS 1,585,690 A * 5/1926 Pratt ..................... F16C 23/086
295/42.1
2,417,559 A * 3/1947 Larson .................. F16C 19/381
193/37

(Continued)

FOREIGN PATENT DOCUMENTS

DE 2412311 A1 * 9/1974 .............. F16C 19/30
DE 3114325 A1 * 10/1982 .............. F16C 19/26

(Continued)

OTHER PUBLICATIONS

International Search Report from PCT/EP2013/058257.

*Primary Examiner* — Marcus Charles
(74) *Attorney, Agent, or Firm* — Bryan Peckjian; SKF USA Inc. Patent Dept.

(57) ABSTRACT

A first rolling-element guided cage segment of a tapered roller bearing has first and second circumferential ends and first and second mutually opposing circumferential bridges extending between the circumferential ends and first and second mutually opposing connecting bridges connecting the first and second circumferential bridges. Inner pocket sides of the circumferential bridges and the connecting bridges form a pocket for receiving a rolling element. A first positioning aid is located at the first circumferential end and a second positioning aid is located at the second circumferential end, the positioning aids being configured such that a correct-position arrangement of adjacent cage segments is recognizable from the interaction of the first positioning aid and the second positioning aid.

15 Claims, 3 Drawing Sheets

(51) Int. Cl.
  *F16C 19/36* (2006.01)
  *F16C 43/06* (2006.01)
  *F16C 41/00* (2006.01)

(52) U.S. Cl.
  CPC ............ *F16C33/4676* (2013.01); *F16C 43/06* (2013.01); *F16C 43/065* (2013.01); *F16C 41/008* (2013.01); *F16C 2300/14* (2013.01); *F16C 2360/31* (2013.01); *Y10T 29/4968* (2015.01); *Y10T 29/49691* (2015.01)

(56) References Cited

U.S. PATENT DOCUMENTS

| | | | |
|---|---|---|---|
| 3,501,212 A | | 3/1970 | Barcht et al. |
| 3,938,866 A | | 2/1976 | Martin |
| 3,966,284 A | * | 6/1976 | Martin ............... F16C 19/10 384/623 |
| 4,472,006 A | * | 9/1984 | Goransson ......... F16C 23/086 384/576 |
| 6,196,728 B1 | * | 3/2001 | Wahler ............... F16C 33/4623 384/580 |
| 6,619,845 B2 | * | 9/2003 | Murata ............... F16C 29/065 384/44 |
| 7,670,058 B2 | * | 3/2010 | Schorr ............... F16C 33/4629 384/572 |
| 2011/0249931 A1 | * | 10/2011 | Omoto ............... F03D 11/0008 384/572 |
| 2012/0063713 A1 | | 3/2012 | Beuerlein |

FOREIGN PATENT DOCUMENTS

| | | | | |
|---|---|---|---|---|
| DE | GB 2104600 A | * | 3/1983 | .............. F16C 19/24 |
| DE | 4027109 A | | 3/1992 | |
| DE | 10246825 A1 | | 4/2004 | |
| DE | WO 2007131478 A2 | * | 11/2007 | .............. F16C 19/34 |
| DE | WO 2009046705 A2 | * | 4/2009 | ............. F16C 33/502 |
| DE | 102009012241 A1 | * | 9/2010 | ............. F16C 33/502 |
| GB | 1469841 A | | 4/1977 | |
| JP | 2007205557 A | * | 8/2007 | |
| JP | WO 2007105476 A1 | * | 9/2007 | ......... F03D 11/0008 |
| JP | 2008082380 A | | 4/2008 | |
| JP | KR 20110015672 A | * | 2/2011 | ......... F16C 33/4635 |
| JP | 2011149549 A | * | 8/2011 | |
| JP | 2011163513 A | | 8/2011 | |
| SE | EP 1408248 A2 | * | 4/2004 | ............. F16C 33/513 |
| SE | EP 2677184 A1 | * | 12/2013 | ......... F16C 33/4611 |

* cited by examiner

CAGE SEGMENT OF A TAPERED ROLLER BEARING, AND TAPERED ROLLER BEARING

CROSS-REFERENCE

This application is the U.S. National Stage of International Application No. PCT/EP2013/058257 filed on Apr. 22, 2013, which claims priority to German patent application no. 10 2012 207 529.1 filed on May 7, 2012.

TECHNOLOGICAL FIELD

The invention relates to a cage segment of a tapered roller bearing. Furthermore, the invention relates to a tapered roller bearing for rotatable supporting of a first machine part relative to a second machine part, in particular for rotatable supporting of a rotor shaft of a wind turbine and a method for assembling a tapered roller bearing.

BACKGROUND

A cage segment of this type is known from DE 10246825 A. The known cage segments can be disposed one-after-another on their end surfaces in a row, so that with a relatively low expenditure a cage can be formed which is suited in particular for use with very large rolling-element bearings having relatively small rollers.

A cage segment is known from JP 2008082380, which includes a solid lubricant, in order to fix the rolling elements to the cage segment.

Given the increasing demand for ever-larger rolling-element bearings, for example for wind turbines, cage concepts are required for ever-higher mechanical loads. The weight of the rolling elements used also increases ever more with the size of the rolling-element bearing, so that ever-more-stable cage assemblies are required for this reason as well.

SUMMARY

The object underlying the invention is to provide a cage design which is suited for use in very large rolling-element bearings, in particular in a rolling-element bearing of a wind turbine, and makes possible a simple assembly of the rolling-element bearing.

This object is achieved by the combination of features of the independent claims.

The inventive cage segment of a tapered roller bearing for rotatable supporting of a first machine part relative to a second machine part includes two mutually opposing circumferential bridges which each extend between a first circumferential end and a second circumferential end of the cage segment, and at least two mutually opposing connecting bridges which connect the two circumferential bridges to each other and form, together with the circumferential bridges, at least one pocket for accommodating a conical rolling element. The circumferential bridges and the connecting bridges have pocket sides which delimit the pocket. The circumferential bridges and the connecting bridges disposed in the region of the first circumferential end and of the second circumferential end have peripheral sides opposing the pocket sides. The cage segment has a first positioning aid in the region of the first circumferential end and a second positioning aid in the region of the second circumferential end. The first positioning aid and the second positioning aid are disposed relative to each other such that a correct-position arrangement of adjacent cage segments relative to each other in the tapered roller bearing is recognizable from the interaction of the first positioning aid and the second positioning aid of these cage segments.

The invention has the advantage that with relatively little expense it is achieved that a misorientation of a cage segment is very easy to recognize during assembly of the tapered roller bearing. In this way assembly errors caused by misorientation of cage segments can be avoided with high reliability.

The first positioning aid and the second positioning aid can be formed complementary to each other. In this manner it can be achieved that a disturbance of the interaction of the positioning aids caused by a position deviation is very clearly visible.

The first positioning aid and the second positioning aid can each be disposed eccentric to the same degree on the peripheral sides of the connecting bridges. In particular, the first positioning aid and the second positioning aid can be disposed on the ends of the peripheral sides of the connecting bridges.

The first positioning aid and the second positioning aid can each be disposed in a section of the peripheral side of the respective connecting bridge which overlaps with one of the circumferential bridges. This has the advantage that the connecting bridges are supported by the circumferential bridges in the region of the positioning aids and a possible material weakening caused by the positioning aids has no negative effects.

For example, the first positioning aid can be formed as an elevation projecting over the peripheral side of the connecting bridge in the circumferential direction, and the second positioning aid as a recess. Such an embodiment is easy to manufacture and does not lead to an impairment of the operation of the tapered roller bearing. In addition, a correct-position arrangement of the cage segments is clearly recognizable. In particular, the second positioning aid can be formed as a step.

In a correct-position arrangement of adjacent cage segments relative to each other the first positioning aid and the second positioning aid of the adjacent cage segments can be in engagement with each other. The first positioning aid and the second positioning aid can be formed such that they are engaged with each other exclusively with a correct-position arrangement of adjacent cage segments. In particular, with a correct-position arrangement the elevations and the recesses of adjacent cage segments are in engagement with one another.

The cage segment can include exactly one pocket. This has the advantage that the cage segment is extremely mechanically stable.

The connecting bridges can each have a concave-shaped first guide surface on their pocket side for partial enclosing of a rolling element in its circumferential direction. Furthermore, the connecting bridges can each have a concave-shaped second guide surface on their pocket side for partial enclosing of a rolling element in its circumferential direction. All of the connecting bridges can be identically formed on their pocket sides. The circumferential bridges can each begin at one of the connecting bridges and end at one of the connecting bridges. The first guide surface and the second guide surface can enclose, on the pocket side of the same connecting bridge, a rolling element disposed in the pocket in different circumferential regions and/or in different axial regions. First projections for supporting the cage segment on an inner rolling-element raceway of the tapered roller bearing and/or second projections for supporting the cage segment on an outer rolling-element raceway of the tapered roller bearing can be formed on the connecting bridges. Additionally or alternatively, the cage segment can be rolling-element guided. The cage segment can be formed such that a first region, within which the first projections extend between the two circumferential bridges, and a second region, within which the second projections extend between the two circumferential bridges, do not overlap with each other.

The invention further relates to a tapered roller bearing for rotatable supporting of a first machine part relative to a second machine part. The inventive tapered roller bearing includes conical rolling elements, each having an axis of rotation, and cage segments which each accommodate at least one rolling element and which each have a first circumferential end and a second circumferential end. The axes of rotation of all rolling elements are disposed on a common conical surface. The cage segments each have a first positioning aid formed as an elevation in the region of the first circumferential end and a second positioning aid formed as a recess in the region of the second circumferential end. The elevations and the recesses of adjacent cage segments engage in each other. The elevations and the recesses can be formed complementary to each other.

The cage segments can be disposed directly adjacent to one another in the circumferential direction of the tapered roller bearing. The tapered roller bearing can be formed such that adjacent cage segments touch at least temporarily. When all adjacent cage segments with the exception of a first and a last cage segment touch, the average clearance between the first circumferential end of the first cage segment and the second circumferential end of the last cage segment outside the positioning aids can be at least 0.15% and at most 1% of the pitch circle circumference. The average clearance can in particular be defined by an arithmetic averaging. The pitch circle can in particular be defined such that it intersects the axes of rotation of the rolling elements respectively in the axial center of the rolling elements. Each cage segment can contain exactly one rolling element. The cage segments can be rolling-element guided. It can be provided that the cage segments are not mechanically connected to one another.

The tapered roller bearing can in particular serve for the rotatable supporting of a rotor shaft of a wind turbine.

The invention also relates to a method for assembling a tapered roller bearing. In the inventive method a plurality of cage segments which each include a first positioning aid and each a second positioning aid are positioned adjacent to one another in the circumferential direction of the tapered roller bearing such that a correct-position arrangement of these cage segments relative to each other is recognizable from the interaction of the first positioning aid and the second positioning aid of adjacent cage segments.

The cage segments can each be fitted with at least one rolling element prior to the positioning in the tapered roller bearing. In this manner the mechanical loading of the cage segments can be kept low during assembly. The cage segments fitted with the rolling elements can be disposed adjacent to one another on the inner rolling-element raceway. In particular, the cage segments can be individually and sequentially mounted.

BRIEF DESCRIPTION OF THE DRAWINGS

The invention will be explained below with reference to the exemplary embodiment depicted in the drawings.

DETAILED DESCRIPTION

Figure 1:
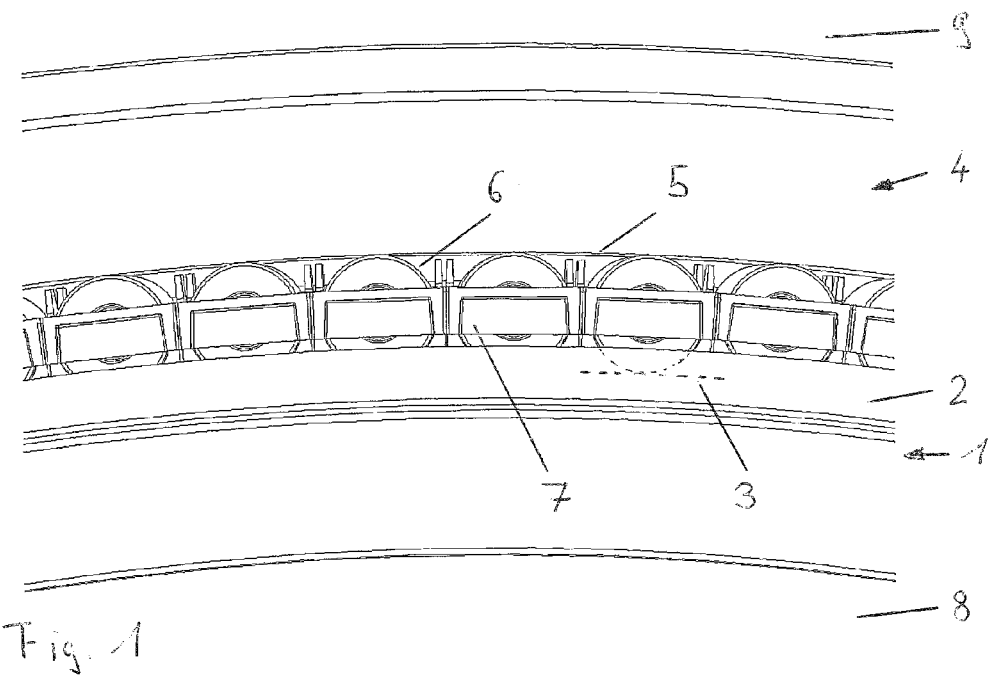
FIG. 1 shows an exemplary embodiment of an inventively formed tapered roller bearing in perspective view.

The tapered roller bearing includes an inner ring 1 having a contact flange 2 and a conical inner rolling-element raceway 3. In the illustration of FIG. 1, the inner rolling-element raceway 3 is obscured by the contact flange 2. Furthermore, the tapered roller bearing includes an outer ring 4 having a conical outer rolling-element raceway 5. Moreover, the tapered roller bearing includes a set of conical rolling elements 6, which roll on the inner rolling-element raceway 3 and on the outer rolling-element raceway 5. Here the rolling elements 6 rotate about their rotational axes, which are not depicted in the Figures, with respect to which the rolling elements 6 are rotationally symmetrically formed. In addition the rolling elements 6 contact the contact flange 2 axially relative to their axes of rotation. The tapered roller bearing also includes a plurality of cage segments 7, which in the illustrated exemplary embodiment each contain a rolling element 6. Here a cage segment 7 is provided for each rolling element 6, so that the individual cage segments 7 each follow one another in the circumferential direction of the tapered roller bearing and each contain a rolling element 6. Here adjacent cage segments 7 can each touch one another. Alternatively the cage segments 7 can also be formed such that they each contain a plurality of rolling elements 6.

The cage segments 7 are rolling-element guided, i.e. they are supported on the rolling elements 6. In most operating situations of the tapered roller bearing, the cage segments 7 are even exclusively rolling-element guided, i.e. there is no touching contact between the cage segments 7 and the inner rolling-element raceways 3 or the outer rolling-element raceways 5 or other components of the inner ring 1 or of the outer ring 4. Details for forming the cage segments 7 are explained with reference to FIGS. 2, 3, 4, and 5.

In a region indicated by the reference number 8 a shaft can be disposed, onto which the inner ring 1 is fitted. The shaft can in particular be a rotor shaft of a wind turbine.

In a region indicated by the reference number 9, a housing 9 can be disposed which accommodates the outer ring 4. The housing can in particular be a component of a rotor bearing of a wind turbine.

Figure 2:
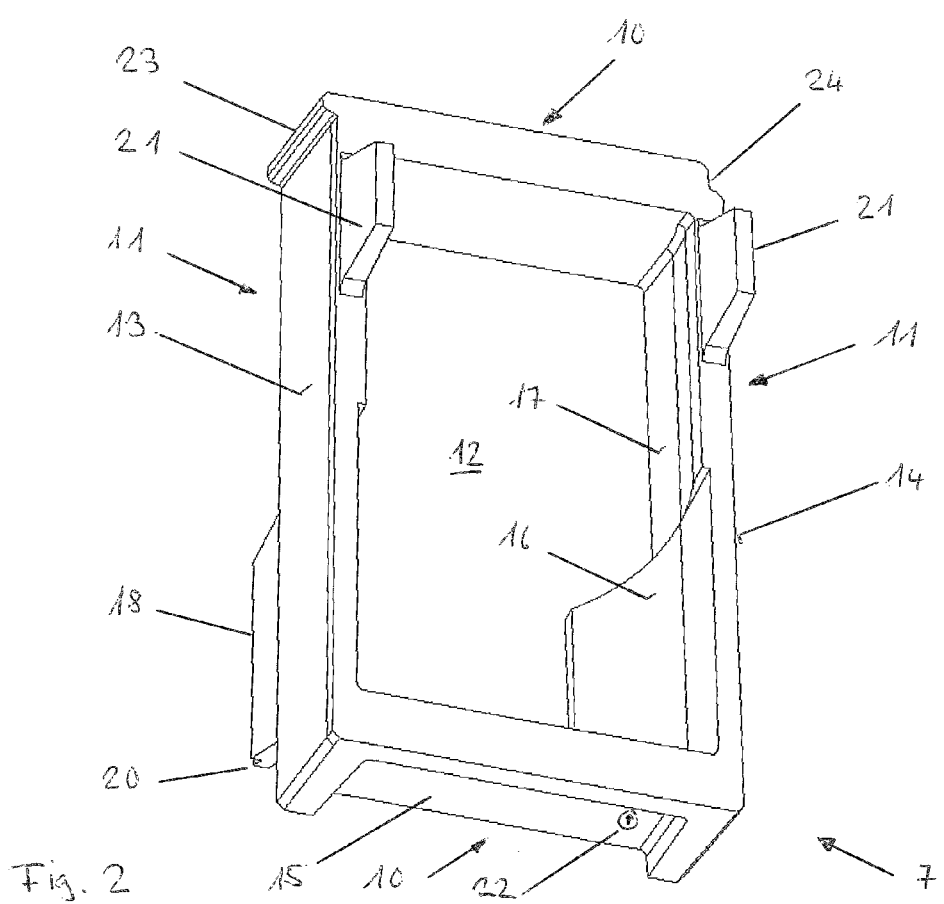
FIG. 2 shows an exemplary embodiment of the cage segment in a perspective view.
Figure 3:
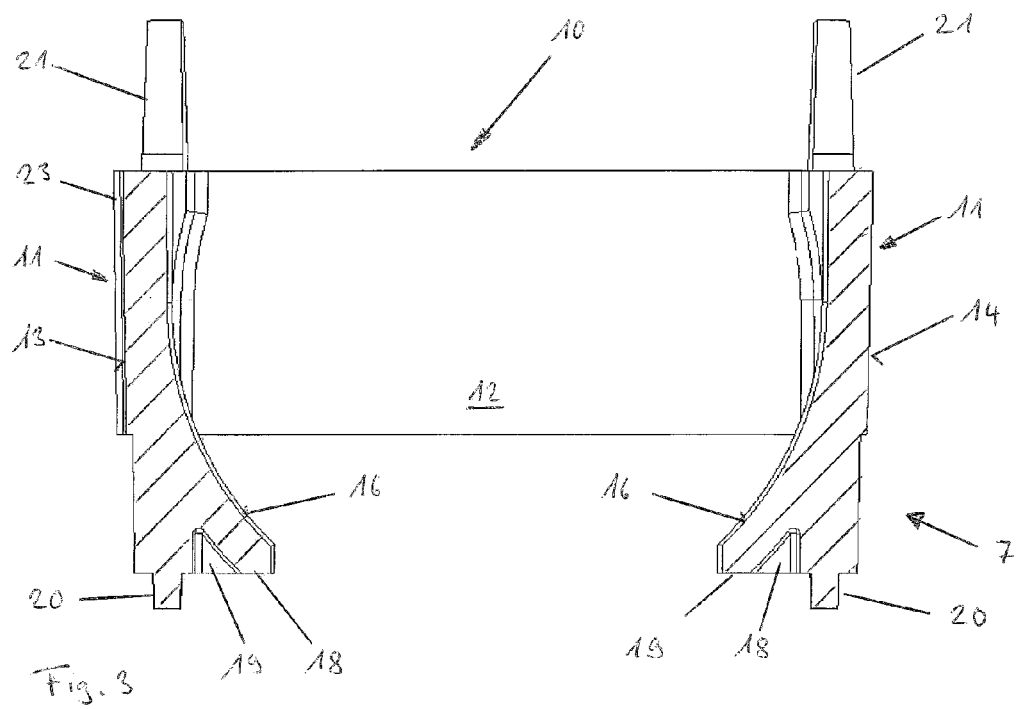
FIG. 3 shows the exemplary embodiment of the cage segment depicted in FIG. 2 in a sectional view.
Figure 4:
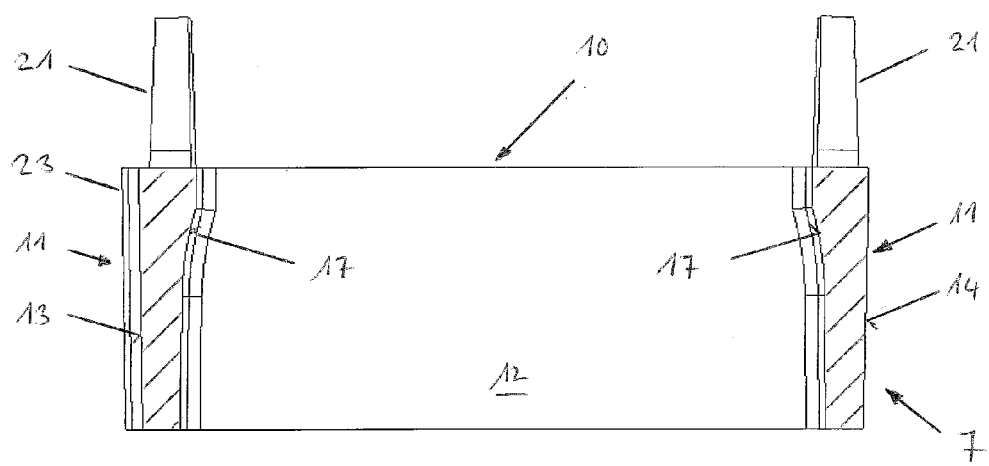
FIG. 4 shows the exemplary embodiment of the cage segment depicted in FIG. 2 in a further sectional view.

FIG. 2 shows an exemplary embodiment of the cage segment 7 in a perspective view. FIG. 3 and FIG. 4 each show the exemplary embodiment illustrated in FIG. 2 in sectional view with respect to different sectional planes. Each illustration in FIGS. 2 to 4 is chosen such that if the cage segment 7 were to be installed in the tapered roller bearing in the illustrated state, the inner rolling-element raceway 3 would extend below the cage segment 7, and the outer rolling-element raceway 5 would extend above the cage segment 7.

The cage segment 7 includes two circumferential bridges 10, disposed at a spacing to each other and oriented parallel to each other, which, in the installed state of the cage segment 7, extend in the circumferential direction of the tapered roller bearing.

Furthermore, the cage segment 7 includes two connecting bridges 11 disposed at a spacing to each other, which form a non-zero angle with each other and connect the two circumferential bridges 10 with each other. In this way a pocket 12 is formed for accommodating a rolling element 6. Due to the non-parallel extension of the connecting bridges 11, the two circumferential bridges 10 have different lengths, and the pocket 12 has the shape of an isosceles trapezoid. The outer dimension of the circumferential bridge 10 from a first circumferential end 13 to a second circumferential end 14 of the cage segment 7 is considered to be the length of the circumferential bridge 10. If the first circumferential end 13 and the second circumferential end 14 of the circumferential bridge 10 are not oriented parallel to each other, the arithmetic mean of the outer dimension can be used in each case. In FIG. 2, the circumferential bridge 10 illustrated in the foreground is longer than the circumferential bridge 10 illustrated in the background.

The sides of the circumferential bridges 10 and of the connecting bridges 11, which delimit the pocket 12, are also referred to in the following as pocket sides. In an analogous manner the sides of the circumferential bridges 10 and connecting bridges 11 opposite the pocket sides are also referred to in the following as peripheral sides, insofar as these do not delimit a further pocket 12. This condition is generally fulfilled with the circumferential bridges 10, unless it is a multiple-row cage segment 7, wherein a plurality of rolling elements 6 are disposed axially one-behind-the-other. This condition is then respectively fulfilled with the connecting bridges 11 if the respective connecting bridge 11 is disposed in the region of the first circumferential end 13 or of the second circumferential end 14 of the cage segment 7, i.e. for the first connecting bridge 11 and the last connecting bridge 11 of the cage segment 7 based on the circumferential direction of the tapered roller bearing. Since the exemplary embodiment of the cage segment 7 illustrated in FIGS. 2 to 4 has only a single pocket 12, in this exemplary embodiment each circumferential bridge 10 and each connecting bridge 11 respectively has a pocket side and a peripheral side.

As already mentioned, if the cage segment 7 has more than one pocket 12, the circumferential bridges 10 of a single-row cage segment 7 then also each have a pocket side and a peripheral side. In contrast, in such a case the connecting bridges 11 can each have either one or two pocket sides, and thus can have either one or no peripheral sides. A connecting bridge 11 that is disposed between two pockets 12 has two pocket sides and no peripheral sides. A connecting bridge 11, which is terminal in the circumferential direction and which delimits only a single pocket 12, has a pocket side and a peripheral side.

In addition to the pocket sides and optionally the peripheral sides, the circumferential bridges 10 and the connecting bridges 11 each have an inner raceway side, which in the installed state is facing towards the inner rolling-element raceway 3 of the tapered roller bearing, and an outer raceway side, which in the installed state is facing towards the outer rolling-element raceway 5 of the tapered roller bearing. In FIGS. 2 to 4 the inner raceway side corresponds to the underside, and the outer raceway side to the topside of the circumferential bridges 10 and of the connecting bridges 11.

In the exemplary embodiment of the cage segment 7 depicted in FIGS. 2 to 4, the inner raceway sides and the outer raceway sides of the circumferential bridges 10 and of the connecting bridges 11 are each formed as a flat surface. In addition, all inner raceway sides of the circumferential bridges 10 and of the connecting bridges 11 each have a partial surface which is formed as a component of a common plane. Likewise, all outer raceway sides of the circumferential bridges 10 and of the connecting bridges 11 each have a partial surface which is formed as a component of a common plane. In exemplary embodiments wherein the cage segment 7 has a plurality of pockets 12, this applies at least to the inner raceway sides and the outer raceway sides of the circumferential bridges 10, and those connecting bridges 11 which delimit the same pocket 12.

The circumferential bridges 10 are in particular formed one-piece with the connecting bridges 11. This one-piece embodiment can be achieved for example by manufacturing the cage segment 7 as a plastic injection-molded part. In addition, the circumferential bridges 10 and the connecting bridges 11 end in the region of the first circumferential end 13 and of the second circumferential end 14 with their peripheral sides flush with one another, i.e. neither do the circumferential bridges 10 protrude past the connecting bridges 11, nor do the connecting bridges 11 protrude outward past the circumferential bridges 10.

The circumferential bridges 10 each have a large-area recess 15 on their peripheral sides, which recess 15 extends over the largest part of the peripheral sides and is framed U-shaped on three sides. Each recess 15 is open towards the lower raceway side of the circumferential bridge 10. Viewed from the recess 15, the circumferential bridges 10 each have a substantially rectangular cross section.

The connecting bridges 11 each have, on their pocket sides, a first guide surface 16 for sliding guidance of the cage segment 7 on a rolling element 6 disposed inside the cage segment 7. Furthermore, the connecting bridges 11 each have, on their pocket sides, a second guide surface 17 for sliding guidance of the cage segment 7 on a rolling element 6 disposed inside the cage segment 7. Only those regions are respectively considered, for the first guide surface 16 and for the second guide surface 17, which can touch the outer surface of a rolling element 6 in the operating state of the tapered roller bearing without a deformation of the cage segment 7. The first guide surface 16 and the second guide surface 17 each do not extend over the entire length of the connecting bridges 11, rather only over a partial region, for example over at most half of the length of the connecting bridges 11. The entire extension of the connecting bridges 11 between the circumferential bridges 10 is viewed as the length of the connecting bridges 11. Here the second guide surface 17 is respectively disposed adjacent to the first guide surface 16 in such a manner that the first guide surface 16 and the second guide surface 17 do not, or only slightly, overlap with each other along the longitudinal direction of the connecting bridge 11. In other words, the first guide surface 16 and the second guide surface 17 are formed in axial regions of a rolling element 6 disposed in the cage segment 7, which do not, or only partially, in particular only slightly, overlap with each other. For example, the first guide surface 16 and the second guide surface 17 overlap by less than 50%, in particular by less than 10%, of the length of the connecting bridge 11. The first guide surface 16 is disposed adjacent to the longer connecting bridge 10 or in its vicinity; the second guide surface 17 is disposed adjacent to the shorter connecting bridge 10 or in its vicinity. In other words, the first guide surface 16 is disposed closer to the longer connecting bridge 10 than the second guide surface 17, and the second guide surface 17 is disposed closer to the shorter connecting bridge 10 than the first guide surface 16.

The first guide surfaces 16 and the second guide surfaces 17 each have a concave shape, so that they each partially enclose a rolling element 6, disposed in the pocket 12 of a cage segment 7, in its circumferential direction.

In addition, the first guide surfaces 16 and the second guide surfaces 17 are each disposed offset to one another such that they guide a rolling element 6, disposed in the pocket 12, in different circumferential regions, or with the reverse perspective, are supported on different circumferential regions of the rolling element 6. In particular, it can be provided that these different circumferential regions do not or only slightly overlap with each other. For example, the circumferential regions can overlap by less than 5% or by less than 1% of the maximum total circumference of the rolling element 6. In the illustrated exemplary embodiment, the first guide surfaces 16 protrude with increasing proximity to the inner raceway side and, in addition, increasingly, and the second guide surfaces 17 protrude with increasing proximity to the outer raceway side increasingly. Accordingly, the first guide surfaces 16 and second guide surfaces 17 increasingly protrude in the region of the pocket 12 with progression in the above-mentioned directions. This means that a rolling element 6 inserted in the pocket 12 is secured against falling out of the pocket 12 on the inner raceway side by the first guide surfaces 16, and on the outer raceway side by the second guide surfaces 17. Thus the rolling element 6 is secured on all sides against falling out, and thus captively disposed in the pocket 12 of the cage segment 7.

As can be seen from FIGS. 2 and 3, the first guide surface 16 is respectively much more pronounced than the second guide surface 17. In order to make this strong pronouncement of the first guide surface 16 possible, a bridge extension 18 is formed on the connecting bridge 11, which bridge extension 18 protrudes over the inner raceway side and progressively thickens with increasing distance from the inner raceway side. The bridge extension 18 has a cavity 19 which is open on the free end of the bridge extension 18. The material thickness of the bridge extension 18 is reduced by the the cavity 19, and the material thickness in other regions of the cage segment 7 is approached by the cavity 19.

Furthermore, a first projection 20 is formed in the region of the free end of the bridge extension 18, which first projection 20 protrudes over the end surface of the bridge extension 18. A second projection 21 is disposed on the raceway side of the connecting bridge 11 in the region wherein the second guide region 17 is formed. In the installed state of the cage segment 7, the first projection 20 extends towards the inner rolling-element raceway 3, but does not touch this when the tapered roller bearing rotates under normal conditions. In an analogous manner the second projection 21 extends towards the outer rolling-element raceway 5, but does not touch this when the tapered roller bearing rotates under normal conditions. If the tapered roller bearing is subjected to a strong pulsed load, in contrast a contact between the first projection 20 and the inner rolling-element raceway 3 or between the second projection 21 and the outer rolling-element raceway 5 can result. The same applies if the tapered roller bearing does not rotate.

In order to facilitate the correct-position installation in the tapered roller bearing, the cage segment 7 has a marking 22 in the region of the recess 15. The marking 22 can also be omitted.

Furthermore, the cage segment 7 includes a first positioning aid 23 and a second positioning aid 24 which facilitate a correct-position assembly of the cage segments 7 during the assembly of the tapered roller bearing. The first positioning aid 23 is disposed in the region of the first circumferential end 13 of the cage segment 7. The second positioning aid 24 is disposed in the region of the second circumferential end 14 of the cage segment 7.

The first positioning aid 23 can be formed as an oblong elevation which is disposed terminally on one of the connecting bridges 11 and ends flush with the circumferential bridge 10. The elevation can extend over the entire region between the inner raceway side and the outer raceway side of the connecting bridge 11.

The second positional aid can be formed as an oblong recess, in particular as a step, which is disposed terminally on one of the connecting bridges 11 and ends flush with the circumferential bridge 10. Just as the elevation, the recess can also extend over the entire region between the inner raceway side and the outer raceway side of the connecting bridge 11.

Figure 5:
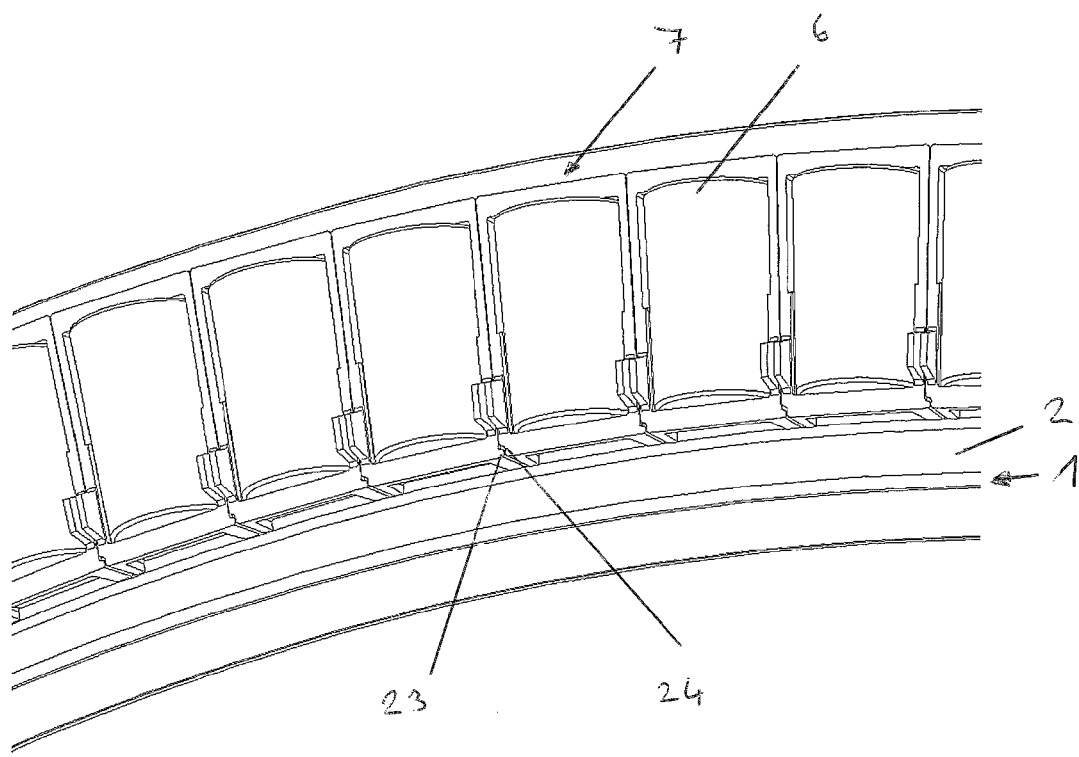
FIG. 5 shows the exemplary embodiment of the tapered roller bearing depicted in FIG. 1 without the outer ring in a further perspective view.

Embodiments differing from the illustration of FIG. 5 are also conceivable for the first positioning aid 23 and the second positioning aid 24. Here the first positioning aid 23 and the second positioning aid 24 can in particular be formed complementary to each other. Furthermore, the dimensions of the first positioning aid 23 and of the second positioning aid 24 can be adapted to each other such that the first positioning aid 23 and the second positioning aid 24 can engage in each other.

During the mounting of the cage segment 7, its first positioning aid 23 interacts with a second positioning aid 24 of an already correct-position-disposed cage segment 7 such that a correct-position arrangement of the newly mounted cage segment 7 is easily recognizable. Details for the mounting are explained with reference to FIG. 5.

Alternatively to the exemplary embodiment illustrated in FIGS. 2 to 4, the cage segment 7 can also have more than one pocket 12 and accordingly can accommodate a plurality of rolling elements 6. For example, in an alternative exemplary embodiment the cage segment 7 can have two pockets 12 which accommodate two rolling elements 6. The two pockets 12 are formed by two circumferential bridges 10 and three connecting bridges 11. Two of the connecting bridges 11, which are formed in the region of the first circumferential end 13 or in the region of the second circumferential end 14 of the cage segment 7, each have a pocket side and a peripheral side. The third connecting bridge 11, which is disposed between the terminal connecting bridges 11, has two pocket sides and therefore no peripheral side.

FIG. 5 shows the exemplary embodiment of the tapered roller bearing depicted in FIG. 1 without the outer ring 4 in a further perspective view. The depicted arrangement corresponds to the installation situation in the tapered roller bearing.

The circumferential bridges 10 of different cage segments 7 each form an angle with each other. In particular, the inner raceway sides of the circumferential bridges 10 of different cage segments 7 each form a non-zero angle with each other. Likewise, the outer raceway sides of the circumferential bridges 10 of different cage segments 7 each form a non-zero angle with each other. In an exemplary embodiment of cage segment 7, which has a plurality of pockets 12, there is also the possibility that the inner raceway sides and/or the outer raceway sides of the circumferential bridges 10 each have a polygon shape, and accordingly sections of the raceway sides which are disposed in the region of different pockets 12 of the cage segment 7 form a non-zero angle with each other.

The geometry of the cage segments 7, in particular of the first guide surface 16 and of the second guide surface 17, is adapted to the rolling elements 6 such that in the rotation state of the tapered roller bearing the cage segments 7 are supported by the rolling elements 6 and touch neither the inner rolling element raceway 3 nor the outer rolling element raceway 5. This means that the tapered roller bearing is rolling-element guided. However, between the inner rolling-element raceway 3 and the first projections 20 of the cage segments 7, as well as between the outer rolling-element raceway 5 and the second projections 21 of the cage segments 7, only a slight clearance is respectively formed, so that with a strong pulsed load or during a stoppage of the tapered roller bearing, a touching contact between cage segments 7 and the inner rolling-element raceway 3 or the outer rolling-element raceway 5 can result. This contact is formed in the region of the first projections 20 or the second projections 21 of the cage segments 7, so that in such a situation the cage segments 7 are supported by the first projection 20 on the inner rolling-element raceway 3 or by the second projections 21 on the outer rolling-element raceway 5. When this particular situation has ended, the touching contact of the cage segments 7 with the inner rolling-element raceway 3 or with the outer rolling-element raceway 5 is also lifted again and a pure rolling guidance again occurs. This means that the first projections 20 and the second projections 21 perform a support function for the cage segments 7 in extreme situations. This support function can also be provided in the case of excessive wear of the cage segments 7, in order to replace the rolling-element guidance, which is no longer present in a sufficient amount, of the cage segment 7.

Furthermore, it follows from FIG. 5 how the first positioning aids 23 of each cage segment 7, each formed as an elevation, engage into the second positioning aids 24 of each adjacent cage segment 7, each formed as a recess therein. Here the mutually adjacent cage segments 7 each touch in the circumferential direction in the region of their first circumferential end 13 and their second circumferential end 14. If adjacent cage segments 7 were to be, for example, disposed offset by 180° with respect to each other, the first positioning aid 23 and the second positioning aid 24 would not be able to engage into each other. Accordingly, during assembly of the tapered roller bearing, an offset-inserted cage segment 7 is immediately apparent. In addition to the assisting of a correct-position assembly, a further function of the first positioning aid 23 and of the second positioning aid 24 is that they secure the cage segments 7 against displacement relative to each other.

For assembling the rolling-element bearing, the cage segments are each initially fitted with a rolling element 6. Then the cage segments 7 fitted with the rolling elements 6 are disposed adjacent to one another on the inner rolling-element raceway 3. Preferably the cage segments 7 are mounted individually and sequentially.

If after completion of the assembly all the cage segments 7 disposed in a row one after another such that adjacent cage segments 7 touch, with the exception of a first and a last cage segment, the average clearance between the first circumferential end 13 of the first cage segment and the second circumferential end 14 of the last cage segment 7 outside the positioning aids 23, 24 is at least 0.15% and at most 1% of the pitch circle circumference. The average clearance can in particular be defined by an arithmetic averaging. The pitch circle can in particular be defined such that it intersects the axes of rotation of the rolling elements 6 respectively in the axial center of the rolling elements 6.

REFERENCE NUMBERS

1 Inner ring
2 Contact flange
3 Inner rolling-element raceway
4 Outer ring
5 Outer rolling-element raceway
6 Rolling element
7 Cage segment
8 Region of a shaft
9 Region of a housing
10 Circumferential bridge
11 Connecting bridge
12 Pocket
13 First circumferential end
14 Second circumferential end
15 Recess
16 First guide surface
17 Second guide surface
18 Bridge extension
19 Cavity
20 First projection
21 Second projection
22 Marking
23 First positioning aid
24 Second positioning aid

The invention claimed is:

1. A cage segment of a tapered roller bearing for rotatably supporting a first machine part relative to a second machine part, the cage segment including:
   two mutually opposing circumferential bridges, which each extend between a first circumferential end and a second circumferential end of the cage segment, and
   at least two mutually opposing connecting bridges, which connect the two circumferential bridges to each other and, together with the circumferential bridges, form at least one pocket for accommodating a conical rolling element, wherein,
   the circumferential bridges and the connecting bridges have pocket sides which delimit the pocket,
   the connecting bridges each have, on their pocket sides, a concave first guide surface and a concave second guide surface for partially enclosing a rolling element in its circumferential direction,
   the circumferential bridges and the connecting bridges which are disposed in the region of the first circumferential end and of the second circumferential end have peripheral sides opposing the pocket sides,
   the cage segment includes a first positioning aid in the region of the first circumferential end and a second positioning aid in the region of the second circumferential end, wherein the first positioning aid and the second positioning aid are disposed relative to each other such that the first positioning aid and the second positioning aid are able to engage with each other only when adjacent cage segments are offset by less than 180° with respect to each other, and
   the cage segment is rolling-element guided.

2. The cage segment according to claim 1, wherein the first positioning aid and the second positioning aid have complementary shapes.

3. The cage segment according claim 1, wherein the first positioning aid and the second positioning aid are disposed in a section of the circumferential side of the respective connecting bridge which overlaps with one of the circumferential bridges.

4. The cage segment according to claim 1, wherein the first positioning aid is formed as an elevation projecting in the circumferential direction over the peripheral side of the connecting bridge and the second positioning aid is formed as a recess.

5. The cage segment according to claim 1, wherein the cage segment includes exactly one pocket.

6. A tapered roller bearing for rotatable supporting of a first machine part relative to a second machine part, including conical rolling elements which each have an axis of rotation, wherein,
the axes of rotation of the rolling elements are disposed on a rounded surface, and
a plurality of the cage segments according to claim 1, which each accommodate at least one rolling element.

7. The tapered roller bearing according to claim 6, wherein the cage segments are disposed directly adjacent to one another in the circumferential direction of the tapered roller bearing.

8. A method for assembling a tapered roller bearing comprising providing a plurality of cage segments according to claim 1 and positioning the plurality of cage segments adjacent to each other in the circumferential direction of the tapered roller bearing such that the first positioning aid and the second positioning aid are able to engage with each other only when adjacent cage segments are offset by less than 180° with respect to each other.

9. The method according to claim 8, wherein the cage segments are each loaded with at least one rolling element prior to the positioning in the tapered roller bearing.

10. The cage segment according claim 1, wherein the first positioning aid includes at least one convex corner to engage with at least one concave corner of the second positioning aid.

11. A first cage segment of a tapered roller bearing for rotatably supporting a first machine part relative to a second machine part, the first cage segment comprising:
a first circumferential end and a second circumferential end;
first and second mutually opposing circumferential bridges extending between the first circumferential end and the second circumferential end of the first cage segment, each of the first and second circumferential bridges having mutually facing pocket sides;
first and second mutually opposing connecting bridges connecting the first and second circumferential bridges, each of the first and second connecting bridges having mutually facing pocket sides, the pocket sides of the circumferential bridges defining with the pocket sides of the circumferential bridges at least one pocket configured to accommodate a conical rolling element; and
a projection at the first circumferential end of the first cage segment and a recess complementary to the projection at the second circumferential end of the first cage segment, the projection of the first cage segment being configured to mate with a recess of a second cage segment adjacent to the first cage segment and the recess of the first cage segment being configured to mate with a projection of a third cage segment adjacent to the first cage segment;
wherein
the pocket sides of the connecting bridges are concave and configured to guide a rolling element,
the projection at the first circumferential end of the first cage segment is able to engage with the recess of a second cage segment only when the first cage segment and the second cage segment are offset by less than 180° with respect to each other, and
the first cage segment is configured to be rolling-element guided.

12. The first cage segment according to claim 11 wherein the projection is formed at a junction of the first circumferential bridge and the first connecting bridge and the recess is formed at a junction of the first circumferential bridge and the second connecting bridge.

13. A first cage segment of a tapered roller bearing for rotatably supporting a first machine part relative to a second machine part, the first cage segment comprising:
a first circumferential end and a second circumferential end;
first and second mutually opposing circumferential bridges extending between the first circumferential end and the second circumferential end of the first cage segment, each of the first and second circumferential bridges having mutually facing pocket sides;
first and second mutually opposing connecting bridges connecting the first and second circumferential bridges, each of the first and second connecting bridges having mutually facing pocket sides, the pocket sides of the circumferential bridges defining with the pocket sides of the circumferential bridges at least one pocket configured to accommodate a conical rolling element;
first positioning means for positioning the first cage segment relative to a second cage segment, the first positioning means located at the first circumferential end of the first cage segment; and
second positioning means for positioning the first cage segment relative to a third cage segment, the second positioning means located at the second circumferential end of the first cage segment,
wherein the pocket sides of the connecting bridges are concave and configured to guide a rolling element,
the first positioning means and the second positioning means are able to engage with each other only when the first cage segment and the second cage segment are offset by less than 180° with respect to each other, and
the first cage segment is configured to be rolling-element guided.

14. The first cage segment according to claim 13, wherein the first positioning means has a shape complementary to a shape of the second positioning means.

15. The first cage segment according to claim 14, wherein the first positioning means comprises a projection and the second positioning means comprises a recess.

* * * * *